United States Patent
Stiehl et al.

(10) Patent No.: US 12,202,413 B2
(45) Date of Patent: Jan. 21, 2025

(54) SYSTEMS WITH SENSOR DEPLOYMENT MECHANISMS

(71) Applicant: Apple Inc., Cupertino, CA (US)

(72) Inventors: Kurt R Stiehl, Los Gatos, CA (US); Christopher P Child, San Jose, CA (US); Michael C Wharton, San Jose, CA (US); Romain A Teil, San Francisco, CA (US); Stephen B Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 17/725,401

(22) Filed: Apr. 20, 2022

(65) Prior Publication Data

US 2022/0396216 A1 Dec. 15, 2022

Related U.S. Application Data

(60) Provisional application No. 63/210,946, filed on Jun. 15, 2021.

(51) Int. Cl.
*B60R 1/00* (2022.01)
*B60R 11/04* (2006.01)
(Continued)

(52) U.S. Cl.
CPC ............. *B60R 11/04* (2013.01); *G01S 7/027* (2021.05); *G01S 7/4813* (2013.01);
(Continued)

(58) Field of Classification Search
CPC ............. B60R 11/04; B60R 2011/004; B60R 2011/0082; B60R 2011/0085;
(Continued)

(56) References Cited

U.S. PATENT DOCUMENTS 8,880,296 B2 11/2014 Breed
9,802,656 B1 * 10/2017 Williams ................ G01S 17/89
(Continued)

FOREIGN PATENT DOCUMENTS

CN 103209864 A 7/2013
CN 107380164 A 11/2017
(Continued)

*Primary Examiner* — Shardul D Patel
(74) *Attorney, Agent, or Firm* — Treyz Law Group, P.C.; G. Victor Treyz; David K. Cole

(57) ABSTRACT

A vehicle may have a vehicle body and one or more movable sensors mounted to the body. A movable sensor may be rotated, linearly translated, or otherwise moved between multiple positions in response to location information, driving mode information, vehicle speed, and/or other information. The movable sensor may be moved to track objects, to provide pedestrians and others with visual feedback, to allow the sensor to gather desired sensor information to support driver assistance and autonomous driving operations, to place the sensor in a stowed position, and to perform other functions. The movable sensor may be protected with a movable cover. A cleaner may clean the sensor. The sensor may be a radar sensor, lidar sensor, camera, or other sensor. Information from the sensor may be used to detect roadway obstructions, to detect objects near the vehicle, to monitor pedestrians, and to monitor other conditions.

24 Claims, 16 Drawing Sheets

(51) Int. Cl.
  *G01S 7/02* (2006.01)
  *G01S 7/481* (2006.01)
  *B60R 11/00* (2006.01)
  *B60S 1/56* (2006.01)

(52) U.S. Cl.
  CPC . *B60R 2011/004* (2013.01); *B60R 2011/0082* (2013.01); *B60R 2011/0085* (2013.01); *B60R 2011/0092* (2013.01); *B60S 1/56* (2013.01)

(58) Field of Classification Search
  CPC ... B60R 2011/0092; B60R 1/00; G01S 7/027; G01S 7/4813; G01S 17/931; G01S 13/931; B60S 1/56
  USPC .......................................................... 701/49
  See application file for complete search history.

(56) References Cited

U.S. PATENT DOCUMENTS

| | | | |
|---|---|---|---|
| 9,911,050 B2 | 3/2018 | Lynam et al. | |
| 10,654,531 B2 | 5/2020 | Del Gaizo et al. | |
| 10,710,513 B2 | 7/2020 | Wilson | |
| 10,928,487 B2 | 2/2021 | O'Keeffe | |
| 2010/0289631 A1 | 11/2010 | Rao et al. | |
| 2011/0205088 A1 | 8/2011 | Baker | |
| 2014/0309885 A1 | 10/2014 | Ricci | |
| 2017/0210297 A1 | 7/2017 | Kim et al. | |
| 2017/0369106 A1* | 12/2017 | Williams | B60R 11/04 |
| 2018/0066467 A1* | 3/2018 | Da Deppo | B60R 11/04 |
| 2020/0156592 A1 | 5/2020 | Zaharia | |
| 2020/0290505 A1* | 9/2020 | Herrmann | B60Q 1/2607 |
| 2021/0206240 A1* | 7/2021 | Berne | B60R 11/04 |
| 2021/0389435 A1* | 12/2021 | Hagen | G01S 7/027 |

FOREIGN PATENT DOCUMENTS

| | | |
|---|---|---|
| CN | 108349440 A | 7/2018 |
| CN | 111989590 A | 11/2020 |
| CN | 112074426 A | 12/2020 |
| CN | 112298205 A | 2/2021 |
| WO | 2018206484 A1 | 11/2018 |
| WO | 2019233575 A1 | 12/2019 |

\* cited by examiner

SYSTEMS WITH SENSOR DEPLOYMENT MECHANISMS

This application claims the benefit of provisional patent application No. 63/210,946, filed Jun. 15, 2021, which is hereby incorporated by reference herein in its entirety.

FIELD

This relates generally to systems such as vehicles, and, more particularly, vehicles that have sensors.

BACKGROUND

Automobiles and other vehicles have propulsion and steering systems. Sensors are used to gather data to support vehicle operations.

SUMMARY

A vehicle may be configured to operate on a roadway or other surface. The vehicle may monitor information on vehicle operation such as vehicle speed, vehicle operating mode (parked or moving), vehicle location, weather, and other information on the vehicle and its surroundings. The vehicle may have one or more movable sensors mounted to a vehicle body.

The movable sensors, which may include sensors such as radar sensors, lidar sensors, cameras, and/or other sensors, may be moved in response to information on the vehicle and its surroundings. For example, a movable sensor may be rotated, linearly translated, or otherwise moved between multiple positions in response to measured and/or predicted location information, parking status, driving mode information (e.g., autonomous, manual, etc.), vehicle speed, weather, and/or other criteria. If desired, a movable sensor may be moved during operation to isolate the sensor from unwanted vehicle motion (e.g., road vibrations, etc.).

In a stowed position, a movable sensor may be protected with a movable cover. A cleaner may clean the sensor. Alignment structures may be used to help accurately maintain the movable sensor in a desired position during use. During vehicle operation, information from the movable sensor may be used to provide control circuitry in the vehicle with driver assistance information and information for an autonomous driving system.

DETAILED DESCRIPTION

A system such as a vehicle or other system may have sensors. The sensors may be used to make measurements on the environment surrounding a vehicle and/or may be used to make measurements on an interior region of a vehicle. Sensors may also be used to gather user input from vehicle occupants and others.

It may be desirable to adjust the position of sensors. For example, it may be desirable to selectively deploy sensors when a vehicle is in motion or is otherwise operating in a particular state where the sensors are to be used. When the sensors are not being used, the sensors may be retracted into a stowed position. If desired, the orientation of a sensor may be adjusted and/or a sensor may be otherwise moved depending on the operating state of the vehicle (e.g., whether being operated autonomously or being driven by a driver), based on vehicle speed, in response to parking status (whether the vehicle is parked or moving), based on current or predicted vehicle location, based on weather, etc. Sensor movements may be controlled using electromechanical actuators or other positioners. In general, sensors may be moved in response to user input, in response to detection of predetermined conditions, and/or in response to satisfaction of other sensor movement criteria.

Figure 1:
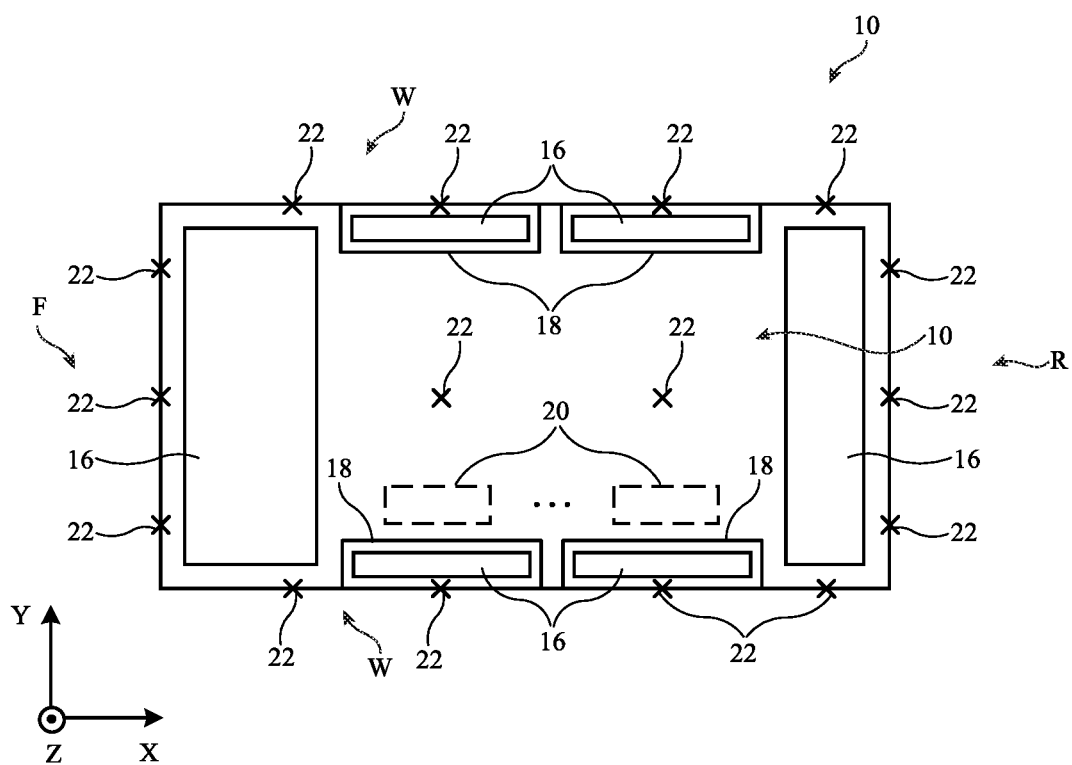
FIG. 1 is a top view of an illustrative vehicle in accordance with an embodiment.

FIG. 1 is a top view of an illustrative vehicle of the type that may include one or more movable sensors. In the example of FIG. 1, vehicle 10 is the type of vehicle that may carry passengers (e.g., an automobile, truck, or other automotive vehicle). Configurations in which vehicle 10 is a robot (e.g., an autonomous robot) or other vehicle that does not carry human passengers may also be used. Vehicles such as automobiles may sometimes be described herein as an example.

Vehicle 10 may be manually driven (e.g., by a human driver), may be operated via remote control, and/or may be autonomously operated (e.g., by an autonomous driving system or other autonomous propulsion system). Vehicle 10 may include a body such as body 12. Body 12 may include vehicle structures such as body panels formed from metal and/or other materials, may include doors, a hood, a trunk, fenders, a chassis to which wheels are mounted, a roof, etc. Doors 18 may be opened and closed to allow people to enter and exit vehicle 10. Seats and other structures may be formed in an interior region within body 12. Windows 16 may be formed in doors 18 (e.g., on sides W of vehicle 10), may be formed in rear R, in front F, and/or on other locations of body 12 (e.g., one or more windows 16 may be formed on top T of body 12 to serve as a sunroof). Windows 16 and portions of body 12 may separate the interior of vehicle 10 from the exterior environment that is surrounding vehicle 10.

Vehicle 10 may include components 20. Components 20 may include propulsion and steering systems (e.g., manually adjustable driving systems and/or autonomous driving systems having wheels coupled to body 12, steering controls, motors, etc.), and other vehicle systems. Components 20 may include control circuitry and input-output devices. The control circuitry may include one or more processors (e.g., microprocessors, microcontrollers, application-specific integrated circuits, etc.) and storage (e.g., volatile and/or non-volatile memory). The input-output devices may include displays, sensors, buttons, light-emitting diodes and other light-emitting devices, haptic devices, speakers, and/or other devices for gathering environmental measurements and/or user input. The sensors in components 20 may include ambient light sensors, touch sensors, force sensors, proximity sensors, optical sensors such as cameras operating at visible, infrared, and/or ultraviolet wavelengths (e.g., fisheye cameras and/or other cameras), capacitive sensors, resistive sensors, ultrasonic sensors (e.g., ultrasonic distance sensors), microphones, three-dimensional and/or two-dimensional images sensors, radio-frequency sensors such as radar sensors, lidar (light detection and ranging) sensors, and/or other sensors. Sensors may be mounted in vehicle 10 in one or more locations such as illustrative sensor locations 22. Output devices in components 20 may be used to provide vehicle occupants and others with haptic output, audio output, visual output (e.g., displayed content, light, etc.), and/or other suitable output. In some configurations, visual output may be provided by moving sensors, sensor covers, and/or other structures in vehicle 10.

During operation, the control circuitry of components 20 may gather information from sensors and/or other input-output devices such as lidar data, camera data (images), radar data, and/or other sensor data. Control circuitry in components 20 may use this data in providing a driver with driver assistance information (e.g., information on nearby obstacles on a roadway and/or other environment surrounding vehicle 10) and/or in autonomously driving vehicle 10.

In some configurations, sensor information and/or other information such as user input and other data may be used in controlling the operation of one or more electrically adjustable components in vehicle 10. For example, control circuitry in vehicle 10 may adjust an electrically adjustable positioner (e.g., an electromagnetic actuators, a stepper motor, a piezoelectric actuators, a solenoid, and/or other electrically adjustable positioner). The positioner may be used to adjust the position of one or more sensors. A positioner may, as an example, be used to translate a sensor along one or more of three orthogonal dimensions (e.g., parallel to X, Y, and/or Z axes or other directions) and/or may be used to rotate a sensor about one or more of these axes or other axes). In some configurations, the positioner may only rotate a sensor about a single axis or may only translate a sensor along a single axis. In other configurations, a positioner (e.g., a positioning system with one or more actuators) may be used to translate a sensor along one or more axes and/or may be use to rotate a sensor about one or more axes.

Figure 2:
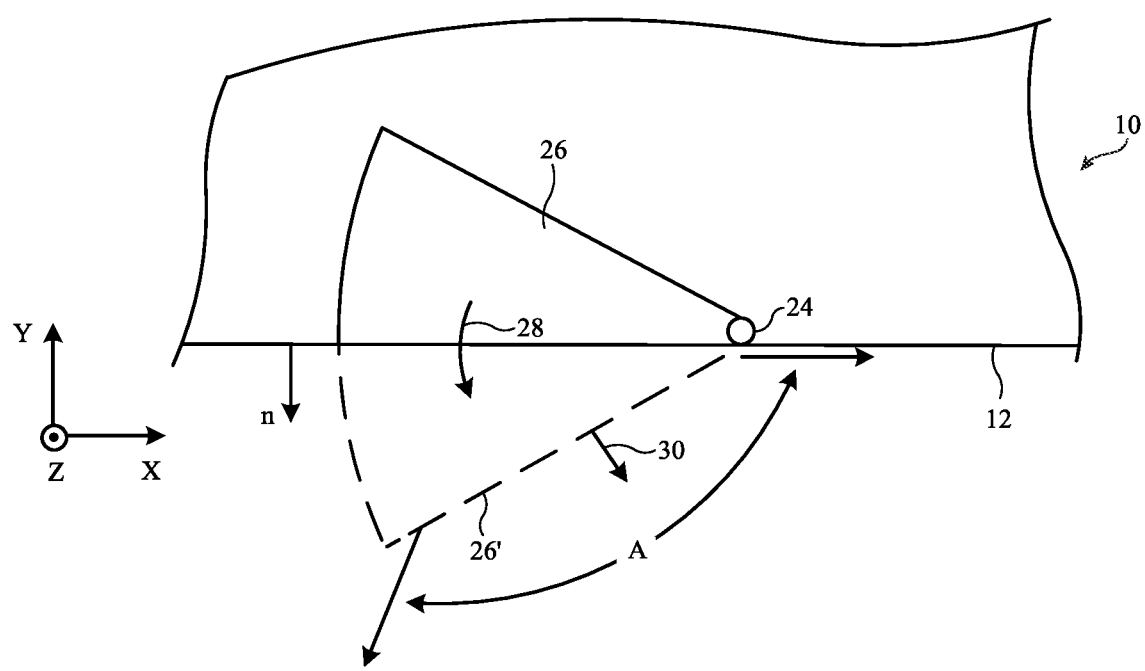
FIG. 2 is a cross-sectional top view of a side portion of an illustrative vehicle in accordance with an embodiment.

FIG. 2 is a cross-sectional top view of an illustrative movable sensor. In the illustrative configuration of FIG. 2, sensor 26 rotates about hinge 24. Hinge 24 or other portion of vehicle 10 may include a motor or other positioner that rotates sensor 26 in and out of body 12. As an example, sensor 26 may be rotated into body 12 to stow sensor 26 (e.g., when sensor 26 is not in use gathering sensor measurements) and may be rotated to position 26' (e.g., to deploy sensor 26 to a position where sensor 26 may be used in gathering measurements). Sensor 26 may have a housing with a surface that lies flush with the exterior surface of body 12 when sensor 26 is stowed or may have other housings.

In an illustrative configuration, sensor 26 is a lidar sensor, radar sensor, camera, and/or other sensor that is characterized by an angle of view (see, e.g., angle of view A in the X-Y plane of FIG. 2). When stowed, sensor 26 may gather data in direction parallel to surface normal n of body 12 (over angle of view A). When deployed, sensor 26 may gather data in direction 30 (over angle of view A). Axis X of FIG. 2 may point towards the rear of vehicle 10, the front of vehicle 10, or other suitable direction. The −Y direction of FIG. 2 may, as an example, be pointed away from the vehicle to the left or right side of vehicle 10.

In an illustrative configuration, axis X points towards the rear of vehicle 10, so that when sensor 26 is in position 26', sensor 26 can gather information on objects located towards the side and rear of vehicle 10. The angle of view A of sensor 26 may, as an example, cover rearward direction X and therefore allow sensor measurements to be gathered in a direction that runs parallel to the side of body 12. Angle of view A may also cover a range of other directions. The value of A may be at least 90°, at least 110°, at least 120°, less than 180°, less than 360°, or other suitable angle-of-view.

Figure 3:
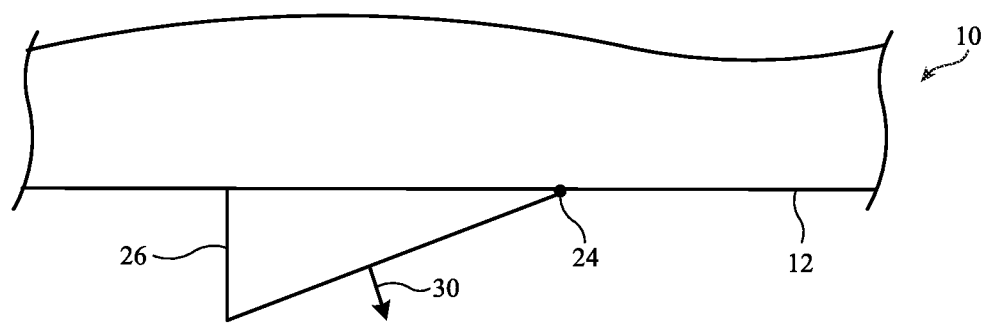
FIGS. 3 and 4 are views of a portion of an illustrative vehicle showing how the amount that a sensor protrudes from a vehicle body can be adjusted in accordance with an embodiment.
Figure 4:
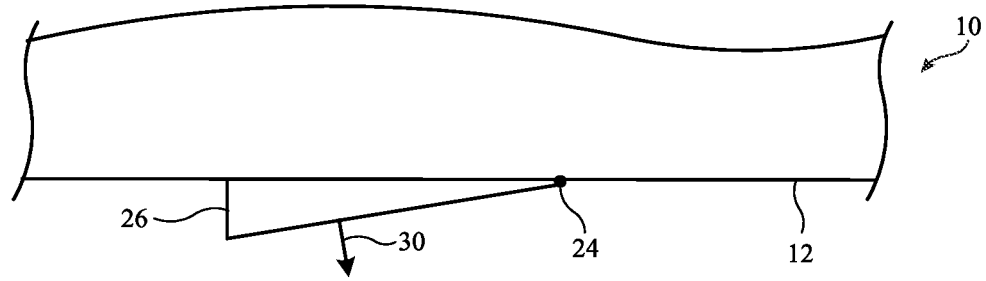

Sensor 26 of FIG. 2 may operate only in the deployed position (position 26'), in both the deployed and stowed positions, and/or may operate over a range of positions including multiple different deployed positions and an optional stowed position. FIGS. 3 and 4 show, for example, how the amount that sensor 26 is rotated about the axis of hinge 24 and therefore the amount by which sensor 26 protrudes out of the side of body 12 may be adjusted so that data capture direction 30 is varied to accommodate different operation conditions. In FIG. 4, sensor 26 protrudes from body 12 more than sensor 26 of FIG. 3. Examples of conditions that may result in the control circuitry of vehicle 10 adjusting the orientation of sensor 26 of FIG. 2 (e.g., the amount of protrusion of sensor 26, the amount of tilt of sensor 26, the direction of view of sensor 26, etc.) include weather conditions, vehicle speed, vehicle location (e.g., global positioning system coordinates or other location data measured with a global positioning system sensor and/or other location sensor), the proximity of vehicle 10 to external objects, the detection of nearby pedestrians, whether vehicle 10 is operating in forward or reverse, time of day, parking status (whether parked or moving), autonomous or manual operating mode, predicted location, other conditions, and/or combinations of any two or more of these criteria. If desired, sensor 26 may be moved to compensate for undesired movements of vehicle 10. In this way, sensors may be isolated from road vibrations and other vehicle motions to improve sensor performance.

Figure 5:
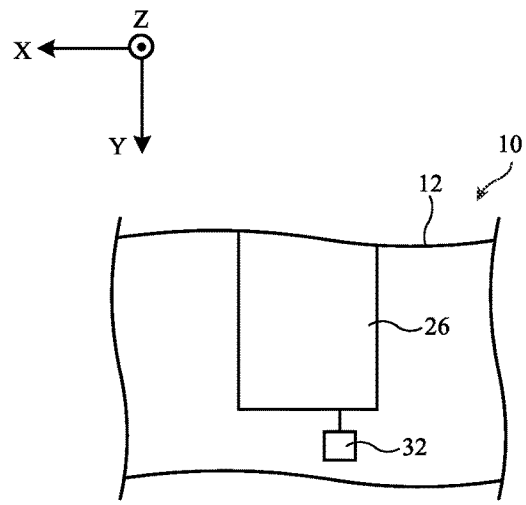
FIGS. 5 and 6 are cross-sectional views of an illustrative vehicle showing how a sensor may be deployed using a translating actuator in accordance with an embodiment.
Figure 6:
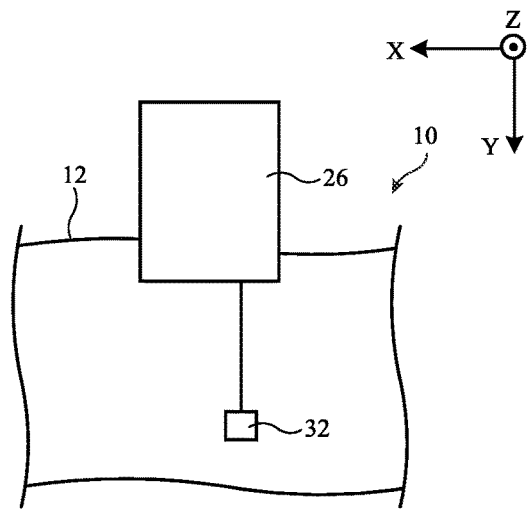

In the examples of FIGS. 2, 3, and 4, a positioner was used to adjust the rotational position of sensor 26 relative to body 12. If desired, a positioner may be used to translate sensor 26 relative to body 12. As an example, positioner 32 of FIG. 5 may be used to move sensor 26 from the stowed position of FIG. 5 in which the housing of sensor 26 is flush with the exterior surface of body 12 to a deployed position such as the position of FIG. 6 by moving sensor 26 parallel to the Y axis. When it is desired to stow sensor 26, positioner 32 may retract sensor 26 into body 12 (e.g., so that the exposed outwardly facing surface of sensor 26 is flush with the external surface of body 12 as shown in FIG. 5). When it is desired to deploy sensor 26, positioner 32 may move sensor 26 outwardly in the -Y direction. The amount of outward protrusion exhibited by sensor 26 relative to body 12 may be adjusted by the control circuitry of vehicle 10. Sensor 26 and positioner 32 may be configured to move sensor 26 relative to any suitable surface of vehicle 10. For example, sensor 26 may be deployed from a surface of body 12 associated with front F, rear R, top T, sides W, and/or other portions of vehicle 10.

Figure 7:
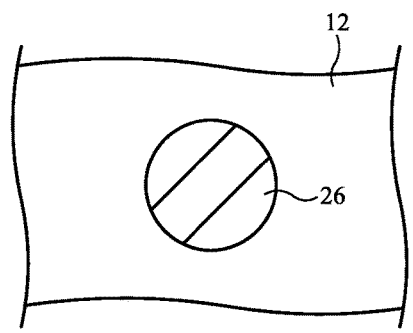
FIGS. 7, 8, 9, and 10 are views of portions of a vehicle body with movable sensors of different illustrative shapes in accordance with embodiments.
Figure 8:
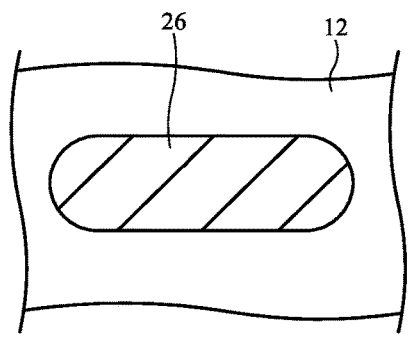
Figure 9:
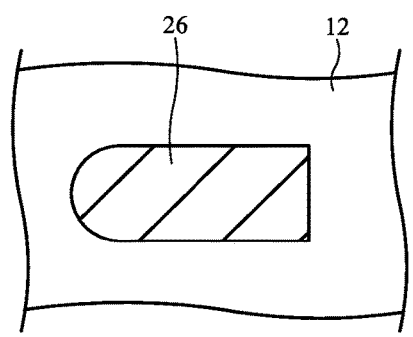
Figure 10:
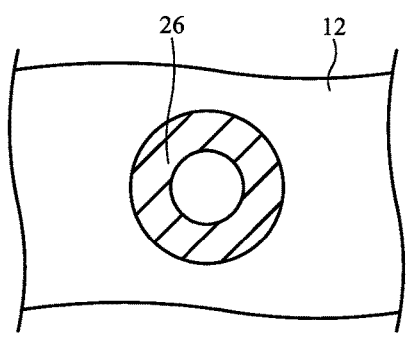

Sensor 26 may have any suitable shape. In the example of FIG. 7, sensor 26 has a circular footprint (e.g., the outline of sensor 26 when viewed by an external viewer whose view is directed towards vehicle 10 may be circular). In the example of FIG. 8, sensor 26 has the shape of a rectangle with four rounded corners (sometimes referred to as a stadium shape). In the FIG. 9 example, sensor 26 has an outline with three straight sides joined by a semicircle segment. In FIG. 10, sensor 26 has a toroid shape. Other outline shapes for sensor 26 may be used, if desired (e.g., shapes with straight edges, curved edges, edges that include both curved and straight segments, triangle shapes, diamond shapes, etc.). Sensor 26 may have a housing with planar surfaces and/or curved surfaces (e.g., surfaces with compound curvature).

Figure 11:
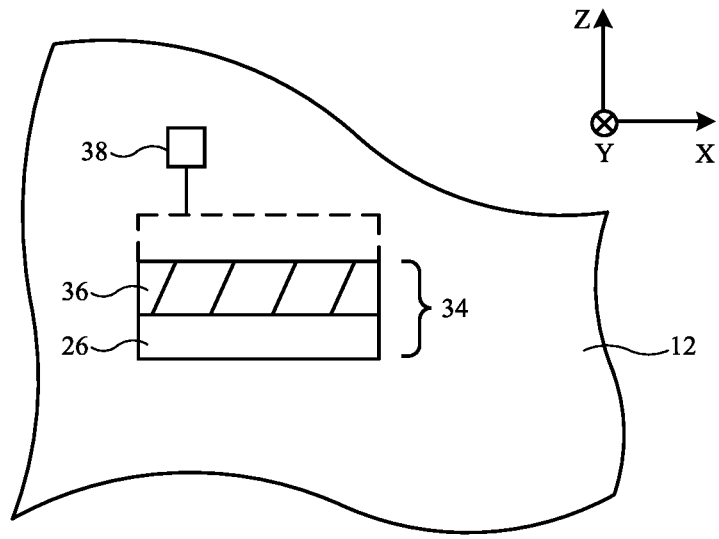
FIGS. 11 and 12 are side views of illustrative deployable sensors with protective sliding cover in accordance with embodiments.
Figure 12:
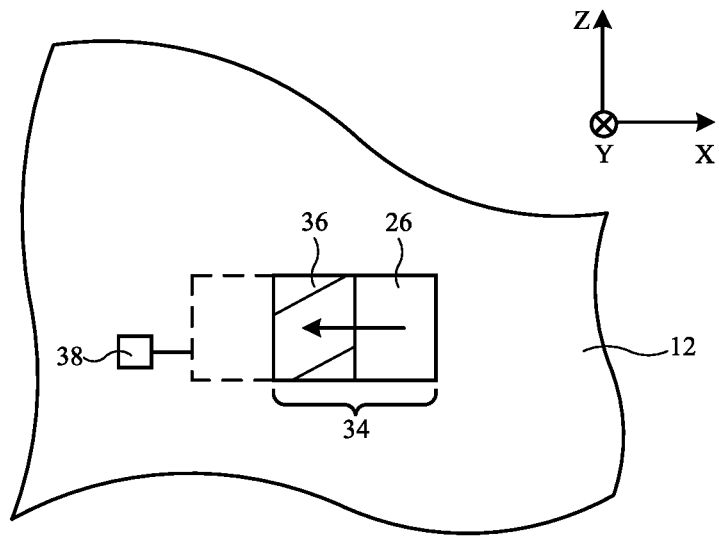

If desired, sensor 26 may be protected using an adjustable window. The window may, have movable shutter blades, a sliding or pivoting window member, or other cover structure for protecting sensor 26 when sensor 26 is stowed. As shown in FIG. 11, for example, sensor 26 may be stowed in window area 34 of body 12 when not deployed. To protect sensor 26 when sensor 26 is stowed in area 34, sensor 26 may be covered with sliding cover (sometimes referred to as a sliding sensor cover or sliding window cover) such as window member 36. Window member 36 may be moved using window member positioner 38. Positioner 38 may, as an example, slide window member 36 downwards in the –Z direction when it is desired to cover area 34 and sensor 26 (e.g., to protect sensor 26 when sensor 26 is not in use). Positioner 38 may slide window member 36 upwards in the +Z direction when it is desired to uncover area 34 and sensor 26. After sensor 26 has been uncovered by moving member 36 away from window area 34, a sensor positioner may translate and/or rotate sensor 26 to deploy sensor 26 for use in gathering sensor measurements. In the example of FIG. 12, sensor 26 has been covered with a horizontal sliding cover formed from siding window member 36 in sensor window area 34.

As with member 36 of FIG. 11, window member 36 of FIG. 12 may be positioned using positioner 38. If desired, window members such as window members 36 of FIGS. 11 and 12 may be rotated in and out of position (e.g., using a rotating positioner), shutter blades may be used to form a leaf shutter adjustable window cover, window members may pivot outwardly from body 12 to form protective door-type covers, and/or protective sensor covers may be formed from other structures. The use of sliding covers for sensors 26 of FIGS. 11 and 12 is illustrative.

Figure 13:
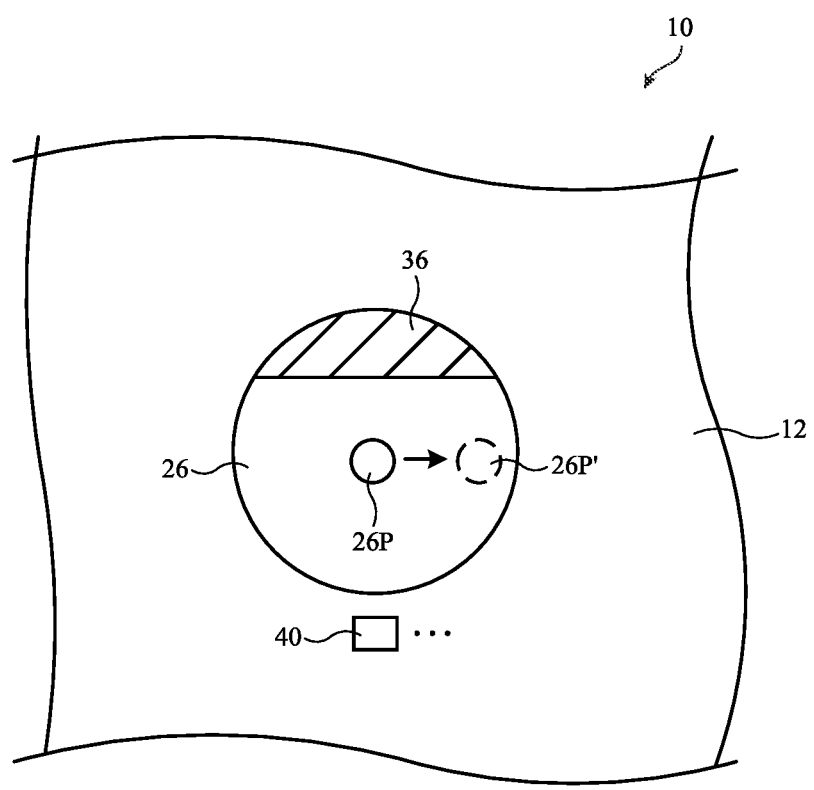
FIG. 13 is a front view of an illustrative vehicle body with a sensor in accordance with an embodiment.

In the example of FIG. 13, sensor 26 has a central portion such as central portion 26P. Portion 26P may be associated with a lens, a part of a lens, decorative marks, an area with a different color or other distinctive appearance relative to adjacent portions of sensor 26, or any other portion of sensor 26 (e.g., a sensor housing portion, etc.). Sensor 26 may have a spherical housing or other shape that allows sensor 26 to swivel within a spherical recess in body 12 and/or to otherwise translate and/or rotate relative to body 12. Due to the shape of sensor window area 34 and the presence of sliding cover 36, sensor 26 may have the appearance of a human eye (as an example). This allows sensor 26 to be adjusted to provide human-like feedback to an observer (e.g., a pedestrian adjacent to vehicle 10). For example, sensor 26 may be moved so that central portion 26P moves to position 26P' (e.g., to track movement of a nearby observer with a behavior mimicking that of a human eye).

If desired, cover 36 may be moved up and down so that sensor 26 has the appearance of a blinking or winking eye. As an observer passes sensor 26, sensor 26 and/or other sensor(s) in vehicle 10, may track the position of the observer and provide this information to the control circuitry of vehicle 10. In response, the control circuitry may use a sensor positioner coupled to sensor 26 to steer sensor 26 so that portion 26P tracks the observer (as a human eye tracks a moving object). This provides the observer with real-time visual feedback indicating that the observer has been detected by sensor 26 in vehicle 10. This may provide the observer with visual confirmation that vehicle 10 has detected the observer, thereby reassuring the observer. In autonomous vehicle contexts, for example, this feedback may help assure the observer that vehicle 10 has recognized the presence of a pedestrian and will therefore not move towards the observer.

In general, any type of sensor movements and/or sensor cover movements may be used to convey feedback to a user (e.g., rotational movements, translational movements, cover sliding movements, cover opening and/or closing movements, etc.). Associated light-emitting devices such as light-emitting diodes, speakers and/or other audio output devices, and/or other output devices may also be used to provide a user with feedback on vehicle operation and/or other information (e.g., by flashing lights, emitting audio tones and/or voice warnings, etc.).

If desired, sensors such as sensor 26 of FIG. 13 and/or other movable sensors may have supplemental sensors such as supplemental sensor 40. Sensor 40 may be, for example, a position sensor such as an accelerometer, gyroscope, compass, and/or an internal measurement unit that includes one, two, or all three of these components, may be a lidar sensor, radar sensor, or camera, and/or may be other suitable sensor. Sensor 40 may be mechanically coupled to sensor 26, so that movements of sensor 26 may be measured using sensor 40. If, as an example, sensor 26 rotates 23° to the left, sensor 40 may detect this movement and may provide the measured angular rotation of sensor 26 to the control circuitry of vehicle 10 in real time (e.g., so that this information may be used to calibrate the positioner(s) associated with moving sensor 26, may be used in accurately controlling the movement of sensor 26, etc.). Sensors such as sensor 40 may also be used to track objects in the field of view of sensor 26 and/or to otherwise supplement the data collection processes performed by sensor 26. In some operating environments, body 12 may vibrate and/or exhibit other undesired movements (e.g., due to road imperfections). By using sensor 40 to measure movements of body 12 and/or sensor 26, a hinge-based actuator or other positioner may be used to produce compensating movements of sensor 26 that tend to stabilize sensor 26. If, as an example, a bump in a road causes sensor 26 to start to angle upwardly, this upward tilt may be detected with sensor 40. Sensor 26 can then be dynamically tilted downward by an equal and opposite amount. This approach may be used to suppress vibrations and/or other undesired movements of sensor 26 that could degrade sensor readings.

Figure 14:
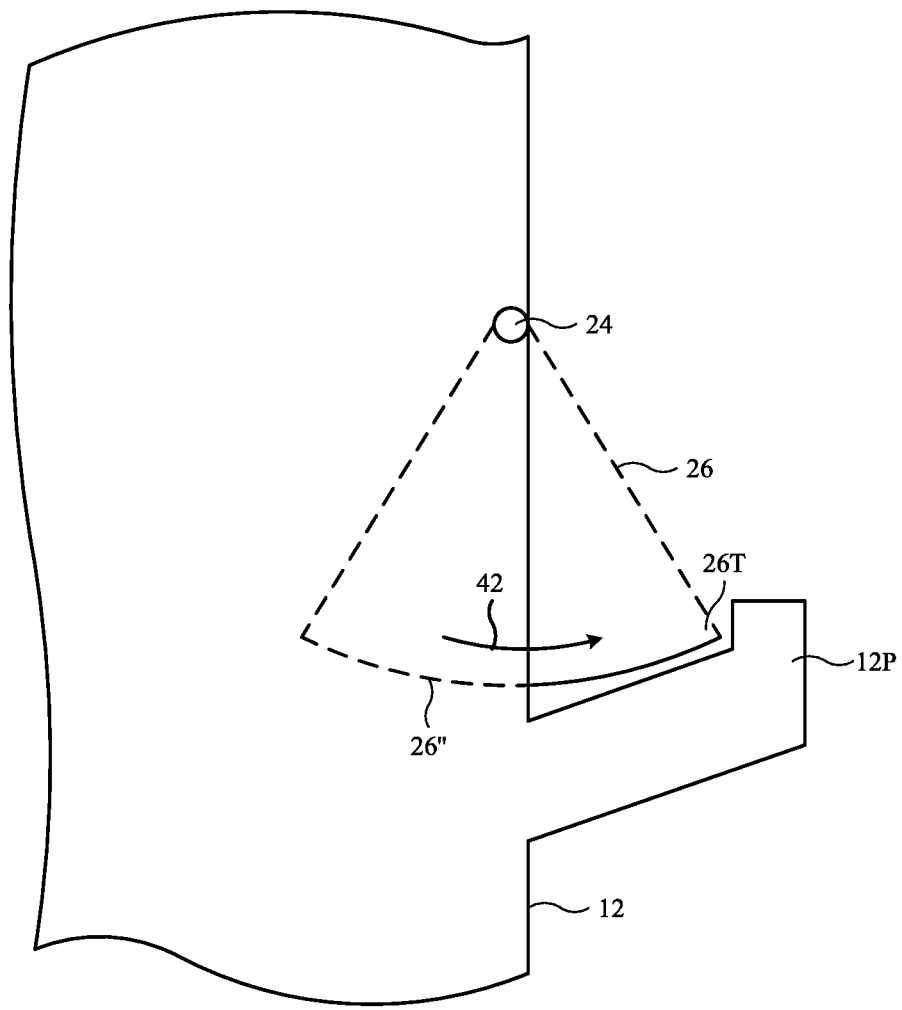
FIG. 14 is a top view of an illustrative vehicle body having a sensor alignment structure in accordance with an embodiment.

To help ensure that sensor 26 is aligned satisfactorily relative to body 12, body 12 may have alignment structures such as portion 12P of FIG. 14. When it is desired to stow sensor 26 of FIG. 12, sensor 26 may be retracted to position 26" by rotating sensor 26 about hinge 24 using an associated sensor positioner (e.g., a motor in hinge 24 or other actuator). When it is desired to deploy sensor 26, sensor 26 may be rotated (pivoted) outwardly from body 12 about hinge 24 in direction 42. Portion 26T of sensor 26 may contact and press against portion 12P of body 12 when sensor 26 is rotated in direction 42. This contact prevents sensor 26 from rotating farther and thereby helps accurately establish the location of sensor 26 relative to body 12 (e.g., portion 12P serves as an alignment structure for sensor 26 that ensures proper positioning of sensor 26 when deployed). One or more alignment structures, which may sometimes be referred to as stops or registration structures, may be included in sensor 26 and/or associated portions of body 12, if desired (e.g., in hinge 24 and/or other portions of vehicle 10). The use of a stop formed from a protruding structure on body 12 is illustrative.

Figure 15:
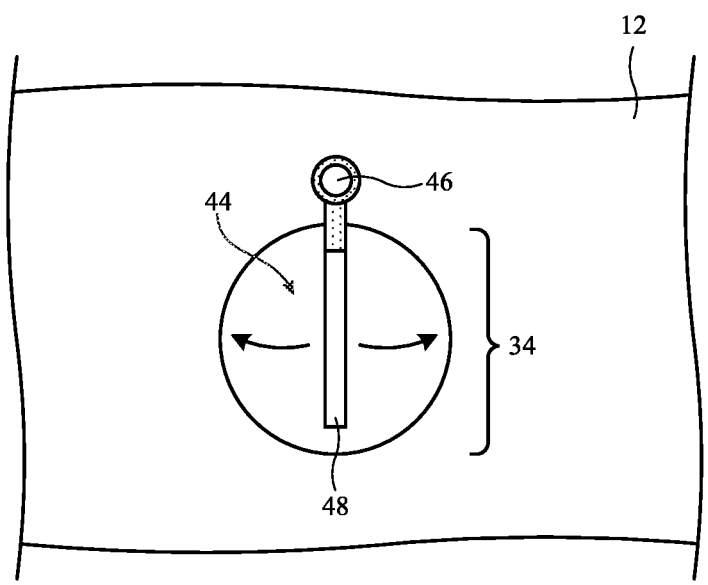
FIG. 15 is a view of an illustrative vehicle having a cleaning mechanism such as a wiper for cleaning a sensor in accordance with an embodiment.

FIG. 15 shows how sensor 26 may be mounted in a window area such as area 34 that has an associated cleaner. Cleaner 44 of FIG. 15 is formed from a wiper having wiper motor 46 and blade 48. Motor 46 may move blade 48 back and forth across sensor 26 (e.g., a sensor window portion of sensor 26) to clean sensor 26 (e.g., when sensor 26 has accumulated road dirt). Spraying nozzles and/or other cleaning mechanisms may be used as cleaners to help ensure that sensors 26 are clean and operating satisfactorily. The use of a wiper-based cleaner in of FIG. 15 is presented as an example.

FIGS. 16, 17, 18, 19 and 20 are diagrams of illustrative deployment systems for sensor 26. Actuators (e.g., motors such stepper motors, linear actuators, solenoids, geared deployment systems, and/or other actuators) may be used in moving sensors 26. The actuators, which may sometimes be referred to as positioners or sensor positioners, may be used to adjust the position (and therefore the angular orientation) of sensor 26 relative to body 12. As an example, a positioner may be used to move a sensor from a stowed position to one or more deployed positions in response to control signals from the control circuitry of vehicle 10 that direct the movement of the sensor. In general, sensor 26 may be translated in one or more different directions and/or may be rotated (tilted) about one or more different axes using one or more positioners. The configurations of FIGS. 16, 17, 18, 19, and 20 are examples.

Figure 16:
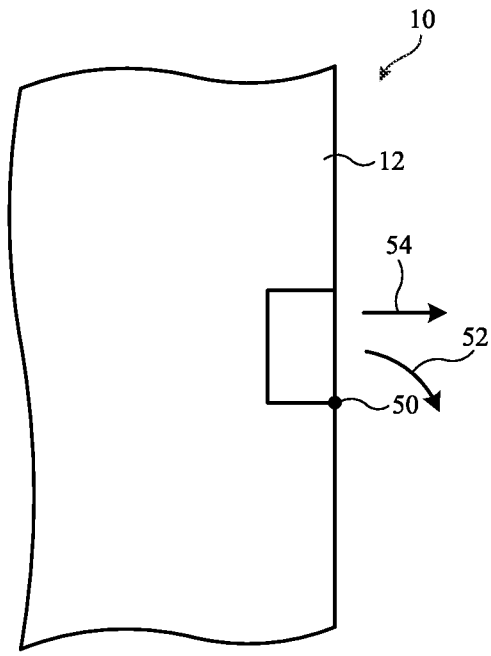
FIGS. 16, 17, 18, 19, and 20 are diagrams of illustrative sensor deployment mechanisms in accordance with embodiments.

In the arrangement of FIG. 16, sensor 26 is in a stowed position in body 12, where the exterior surface of sensor 26 lies flush with the adjacent exterior surface of body 12. When it is desired to change the position of sensor 26 (e.g., to provide sensor 26 with a different view of the external environment surrounding vehicle 10), sensor 26 may be rotated by a rotational positioner about pivot point 50 (e.g., a hinge axis) and/or may be translated outwardly in direction 54 by a translational positioner.

Figure 17:
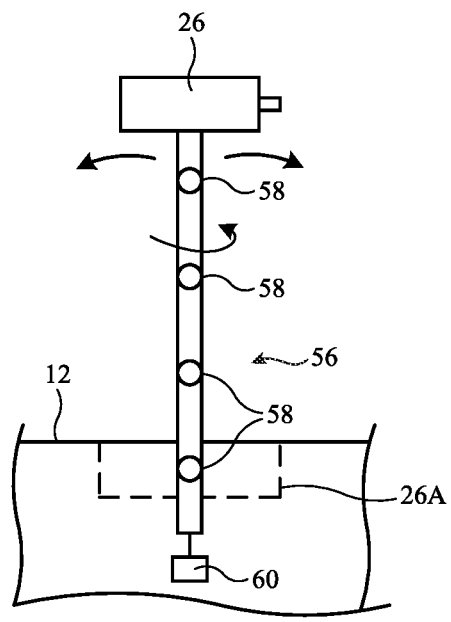

In the arrangement of FIG. 17, sensor 26 has been deployed on the end of an adjustable such as arm 56. Arm 56 may be a robotic segmented arm having a series of arm segments joined by respective rotary joints 58, each of which may have a respective rotational actuator. The base of arm 56 may be mounted to rotational positioner 60. Arm 56 may deploy by telescoping (e.g., using linear actuators to extend each arm segment from within an adjacent arm segment) and/or by unfolding previously folded arm segments. The adjustability of arm 56 allows sensor 26 to be tilted in different directions and, if desired, to be rotated by rotational base actuator 56. There may be any suitable number of rotary joints in arm 56 (e.g., at least one, at least two, at least five, at least ten, fewer than twenty, fewer than seven, etc.) and there may be any suitable number of arm segments in arm 56 (e.g., at least one, at least two, at least five, fewer than twenty, etc.). When it is desired to stow sensor 26, sensor 26 may be retracted into sensor storage recess 26A, so that sensor 26 lies flush with the surface of body 12, as described in connection with other illustrative storage arrangements.

Figure 18:
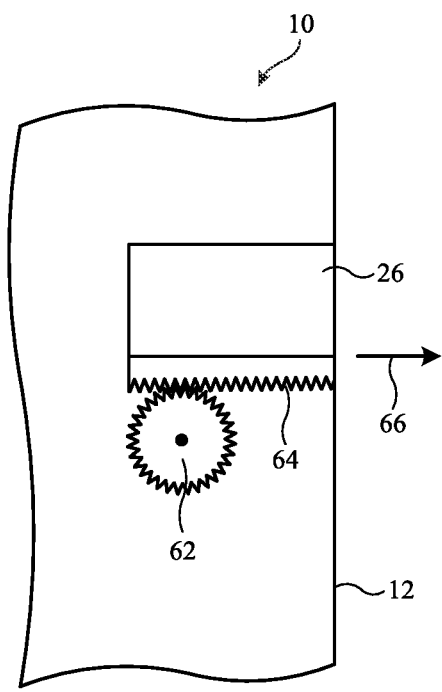

FIG. 18 shows how sensor 26 may be deployed with a rack-and-pinion system. As shown in FIG. 18, sensor 26 may be stowed in body 12. When it is desired to deploy sensor 26, sensor 26 may be moved outwardly from its storage location in body 12 using a positioner that has a rotating motor that drives gear 62. As gear 62 turns, the teeth of gear 62 engage the teeth of geared member 64 and move geared member 64 outwardly in direction 66. Geared member 64 is coupled to sensor 26, so that sensor 26 is deployed in direction 66.

Figure 19:
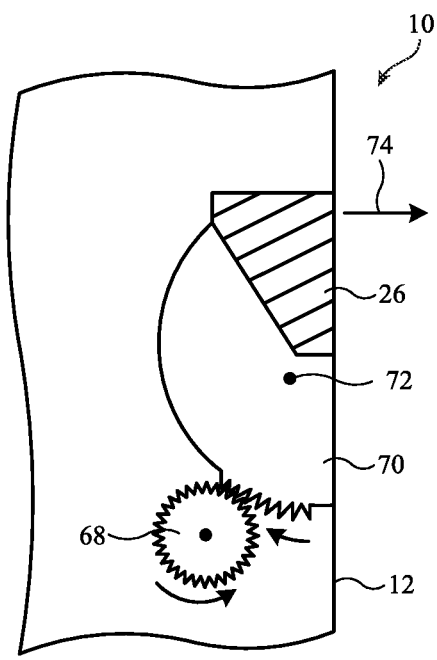

FIG. 19 shows how a rotational actuator may be used to rotate gear 68 and thereby rotate sector gear 70 about axle 72. Sensor 26 is coupled to sector gear 70, so the rotation of gear 70 causes sensor 26 to be rotated outwardly in direction 74. The rotation of gear 68 may therefore be used to control the rotational deployment of sensor 26 from a storage recess in body 12.

Figure 20:
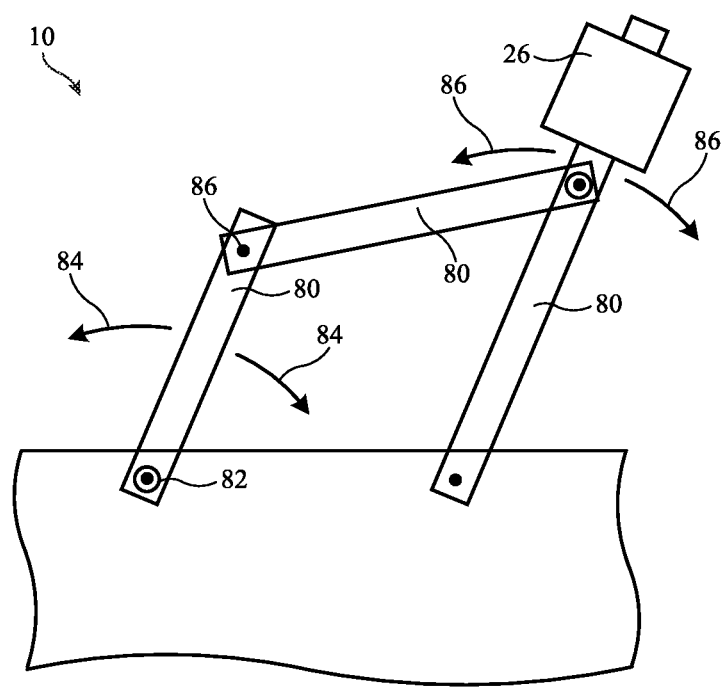

Another illustrative deployment mechanism is shown in FIG. 20. In the example of FIG. 20, sensor 26 is mounted to one of the arms of a four-bar linkage. The linkage may have pivot points about which the arms of the linkage rotate relative to each other and body 12. Rotational positioner 82 may be coupled to one of the arms and may rotate that arm in directions 84, thereby rotating sensor 26 in directions 86. Other linkage types may be used, if desired. The use of a four-bar linkage to control the position of sensor 26 is illustrative.

Figure 21:
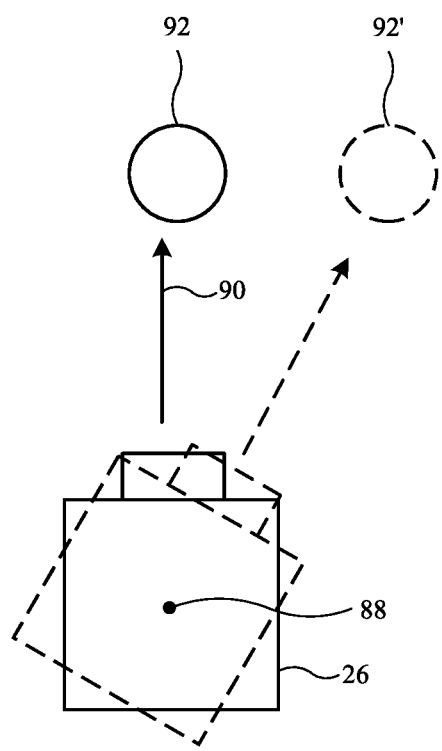
FIG. 21 is a diagram showing how the orientation of a sensor may be adjusted to track an object or otherwise enhance performance during operation in accordance with an embodiment.

Sensor 26 may be moved to stow sensor 26 in body 12, to place sensor 26 in an advantageous position for gathering sensor data (e.g., a position in which the sensor is at least partly protruding from body 12), to provide a viewer with visual output, and/or to otherwise locate sensor 26 in a desired position. If desired, sensor 26 may be moved to track items of interests (e.g., buildings, automobiles, pedestrians, roadways, obstructions, etc.). Consider, as an example, sensor 26 of FIG. 21. As shown in FIG. 21, a positioner may be used to rotate sensor 26 about axle 88. Initially, sensor 26 may be gathering data in direction 90. Sensor 26 may, as an example, gather data on item 92 in the field of view of sensor 26. Item 92 may move to a new location such as location 92' while sensor data is being gathered. To ensure that sensor readings are gathered satisfactorily on item 92, the positioner may adjust the position of sensor 26. The positioner for sensor 26 may, as an example, rotate sensor 26 to track item 92 as item 92 moves relative to sensor 26.

In general, any suitable translational and/or rotational repositioning operations may be used on sensor 26. The use of a rotational adjustment to sensor 26 of FIG. 21 is an example. Moreover, in addition to and/or instead of tracking moving objects with sensor 26, sensor 26 may be repositioned so that the angle of view of sensor 26 allows sensor data to be gathered on additional items and/or different items of interest. As an example, sensor 26 may be mounted to the left side of vehicle 10 and may normally be used to monitor for traffic and pedestrians located horizontally to the left of vehicle 10. If, however, vehicle 10 is moving slowly in reverse during a parking operation and/or when vehicle 10 is parked, sensor 26 may be reoriented to tilt down and toward the rear of vehicle 10 to make sure there are no obstructions on the roadway adjacent to the vehicle.

Figure 22:
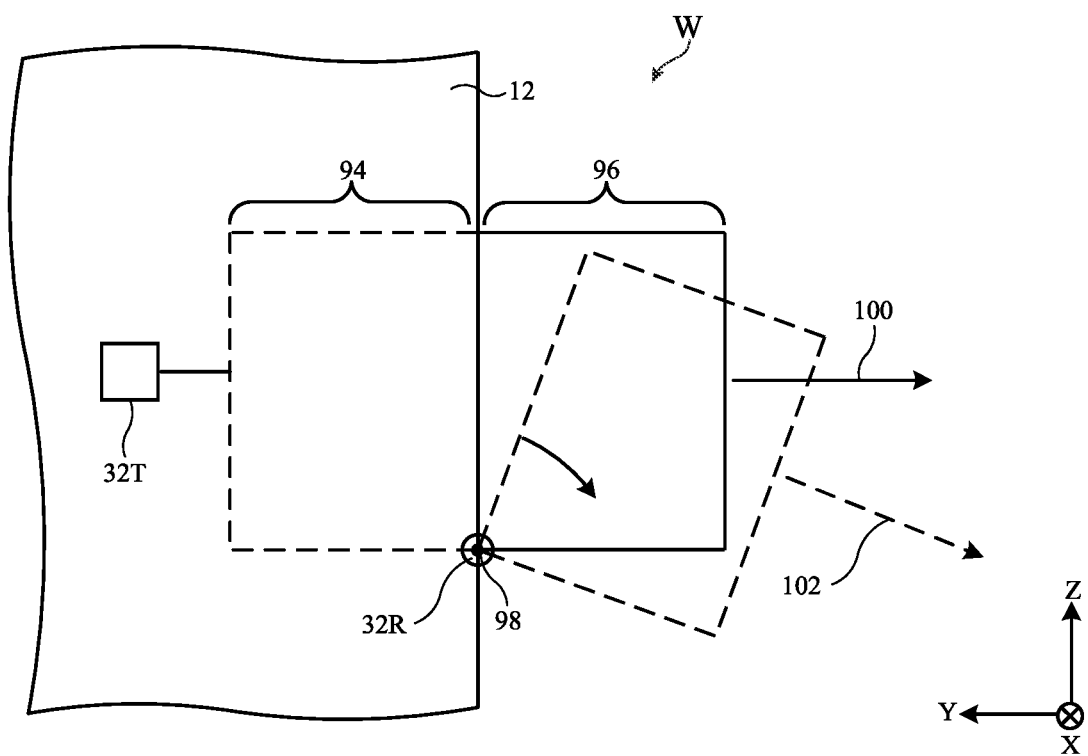
FIG. 22 is a diagram showing how a sensor may be tilted downwards during operation in accordance with an embodiment.

Both translational motion and rotational motion may be involved in deploying sensor 26. As shown in the cross-sectional view of body 12 of FIG. 22, translational positioning equipment 32T may be used to deploy sensor 26 laterally by moving sensor 26 from its stowed position (position 94) in which the surface of sensor 26 is flush with the exterior surface of body 12 to a deployed position (position 96) in which sensor 26 protrudes from body 12. The positioner for sensor 26 of FIG. 22 also includes rotational positioning equipment 32R, which can be used to tilt sensor 26 downwardly about hinge axis 98 when it is desired to change the direction of view of sensor 26 from sideways direction 100 to downwardly angled direction 102. By tilting sensor 26 in direction 100, sensor 26 may be used to view the roadway adjacent to vehicle 10 (as an example). The amount of downwards (or upwards) tilt of sensor 26 may be adjusted dynamically depending on the operating status of vehicle 10 (e.g., whether vehicle 10 is parked and therefore stationary, whether vehicle 10 is moving, the direction of movement of vehicle 10, the location of vehicle 10, the speed of vehicle 10, and/or other criteria). As an example, sensor 26 may be placed in a stowed position when parked, a first deployed position when moving at a first speed (e.g., a speed between a first threshold and a second threshold), and may be placed in a second deployed position when moving at a second speed (e.g., a speed between the second threshold and a third threshold). Sensor data (e.g., speedometer data, location data from a global positioning system sensor, and/or other sensor data) may be used to determine vehicle speed and/or vehicle speed may be inferred from control signals supplied to wheel motors or other propulsion system components.

If desired, one or more sensors 26 in vehicle 10 may be provided with position locking systems. A position locking system may be operated in an unlocked state in which sensor 26 is free to move (e.g., in which sensor 26 is placed in a desired position by an associated positioner) and a locked state in which sensor 26 is secured in a desired position (e.g., to that undesired drift or other movement of sensor 26 is avoided during sensor measurements). The control circuitry of vehicle 10 may control the position locking system depending on criteria such as whether sensor 26 has been deployed to a desired position or is stowed, whether vehicle 10 is moving or is stationary, and/or other criteria.

Sensor position locking systems may have permanent magnets that create locking detents, electrically adjustable magnets such as electromagnets that can be used to form an electrically adjustable magnetic latch, a mechanical interlock formed from a moving pin or other structure that physically engages sensor 26, an adjustable clutch that can selectively apply braking power to hold sensor 26 in place, and/or any other sensor position locking mechanism.

Figure 23:
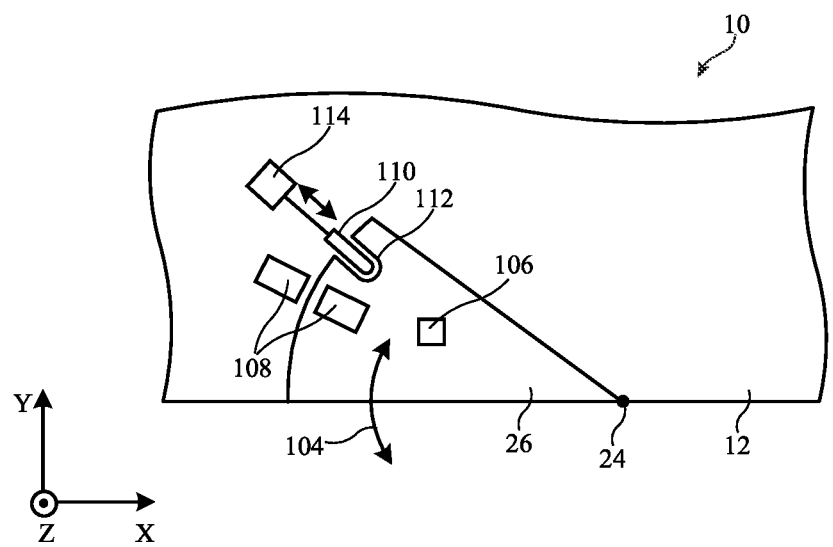
FIG. 23 is a top view of an illustrative deployable sensor having an associated position sensor and associated locking mechanisms in accordance with embodiments.

In the example of FIG. 23, sensor 26 is configured to swing about hinge 24 in directions 104 under control of a rotational positioner (e.g., a positioner associated with hinge 24). An optional sensor such as inertial measurement unit 106 or other supplemental sensor may optionally be used to monitor the position of sensor 26 (e.g., the angular orientation of sensor 26 relative to body 12, etc.). To help hold sensor 26 in a desired position (e.g., a desired deployed position or a desired stowed position), movement of sensor 26 may be locked using a position locking system formed from magnets 108 (e.g., permanent magnets and/or electromagnets), an adjustable clutch (e.g., an electrically adjustable brake in hinge 24), and/or a mechanical latch (see, e.g., pin 110, which may be withdrawn from recess 112 by positioner 114 when it is desired to unlock sensor 26 and which may be inserted into recess 112 by positioner 1114 when it is desired to mechanically lock sensor 26 in place. Sensor 26 may be locked in one or more rotational and/or translational locations, may be locked in place when stowed, may be locked in placed when deployed, and/or may otherwise be selectively locked in place using the position locking system.

Figure 24:
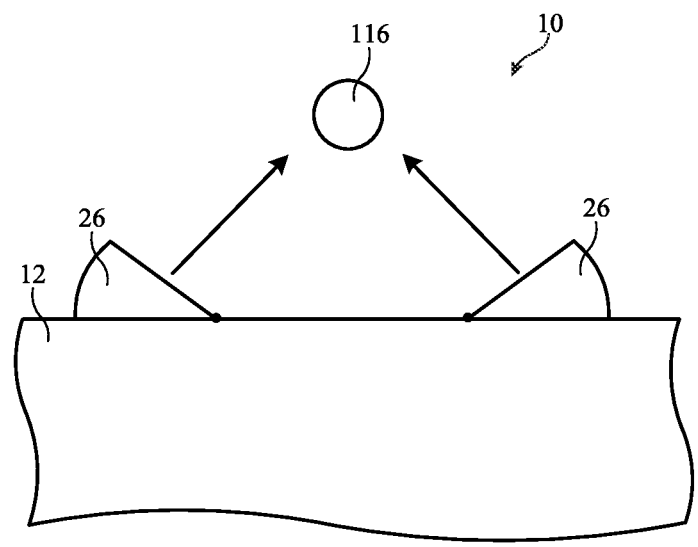
FIG. 24 is a diagram showing how first and second sensors may be used in calibrating each other in accordance with an embodiment.

FIG. 24 is a top view of a portion of vehicle 10 in an illustrative configuration in which a pair of sensors such as movable sensors 26 have overlapping fields of view. This allows both sensors 26 to gather sensor data (e.g., images, lidar readings, radar data, etc.) on one or more common objects such as object 116. By comparing and synthesizing data from both sensors 26 such as data on the location of object 116 within the field of view of each sensor, the sensors can be calibrated (e.g., the direction of view of each sensor can be determined as a function of position for that sensor). Calibration measurements may be made using sensor data from a pair of overlapping sensors 26, from at least three sensors with overlapping fields of view, and/or from other suitable numbers of sensors 26 in vehicle 10 that have overlapping views.

Figure 25:
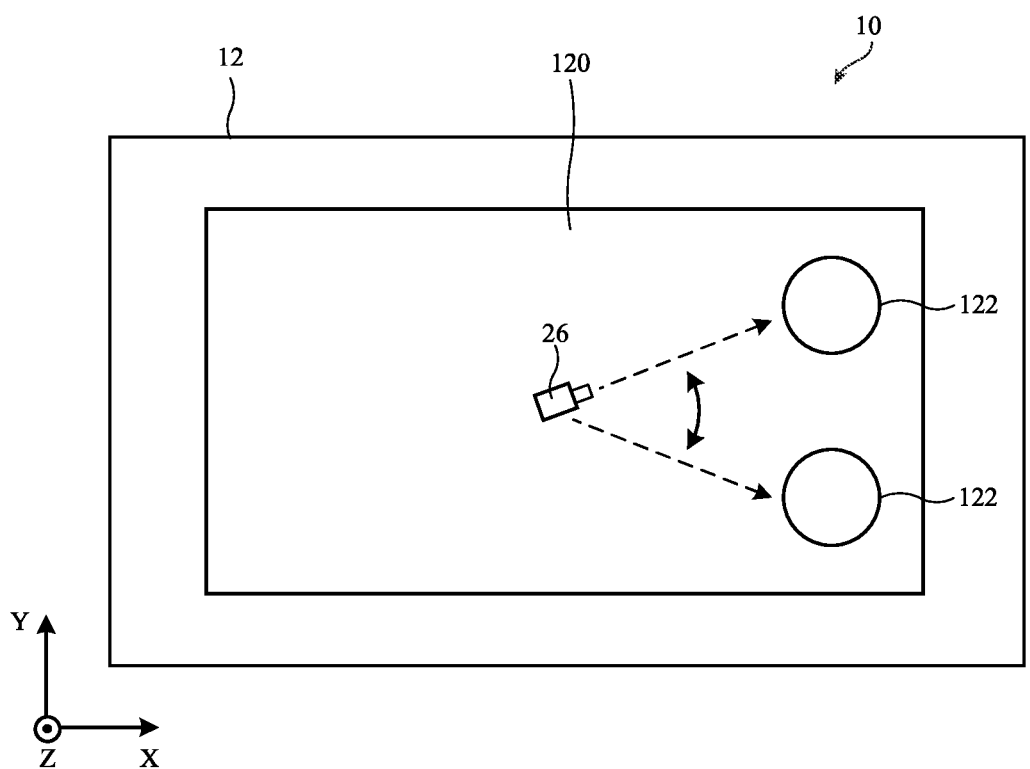
FIG. 25 is a top view of an illustrative vehicle showing how a sensor in the interior of the vehicle may be moved in accordance with an embodiment.

FIG. 25 shows how a positioner may be used to adjust the position of a sensor that is located in interior region 120 of vehicle 10. Body 12 may have portions that define an interior area such as region 120 for vehicle occupants. Moveable sensors 26 may include cameras (2D and/or 3D image sensors), radar sensors, lidar sensors, optical sensors, ultrasonic sensors, capacitive sensors, force sensors, temperature sensors, and/or other sensing devices and may be used to gather images of vehicle occupants and other items in interior region 120, may be used to gather environmental measurements on the interior environment of vehicle 10, may be used to gather user input from occupants in interior region 120 (e.g., hand gestures, audio input, touch input, and/or other user input), and/or may gather other sensor data. The positioner for each movable sensor 26 in interior region 120 may adjust the position of the sensor to track moving vehicle occupants, to stow and/or deploy the sensor, to adjust the portion of region 120 from which data is gathered, to provide the occupants with visual output (e.g., visual feedback of a sensor function) and/or to otherwise operations with the sensor.

Figure 26:
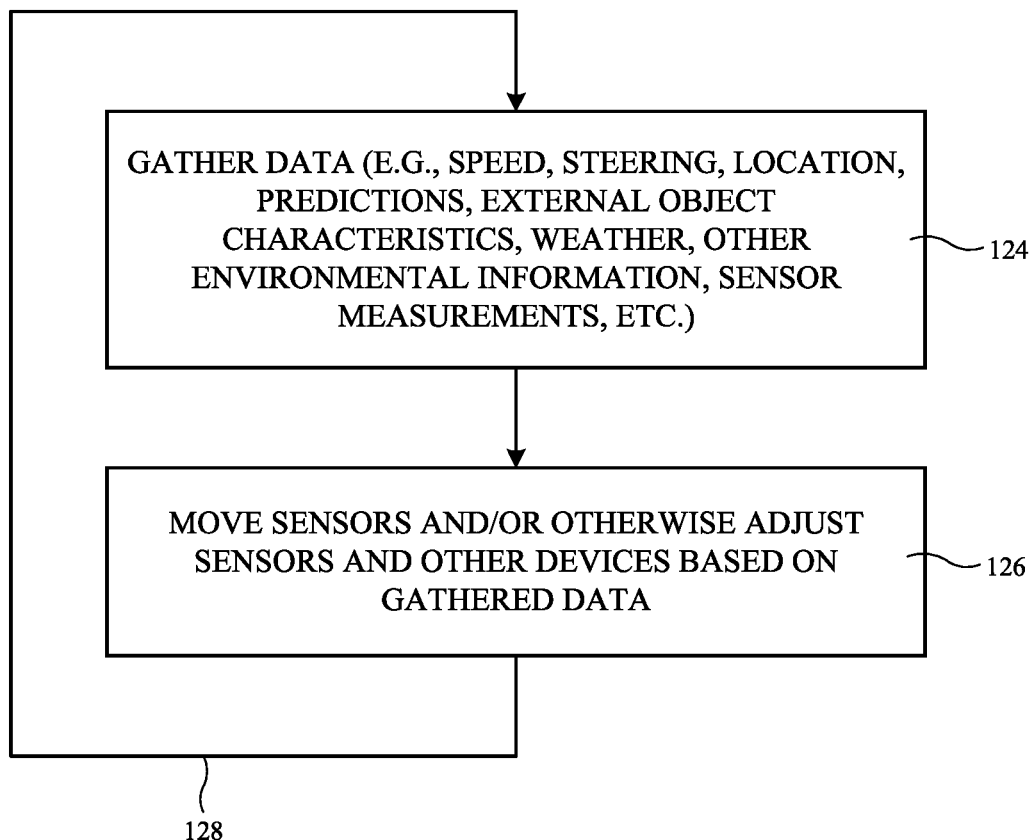
FIG. 26 is a flow chart of illustrative operations associated with using a vehicle with adjustable sensors in accordance with an embodiment.

FIG. 26 is a flow chart of illustrative operations associated with using sensors in vehicle 10. During the operations of block 124, sensors in vehicle 10 may be used to gather data. These sensor may include vehicle sensors, cameras, radar, lidar, and/or other sensors (e.g., sensors 26 that may be moved by positioners, stationary sensors, etc.). Data may also be obtained wirelessly from remote sources (e.g., vehicle 10 may use long-range wireless communications circuitry to receive data from other vehicles, from stationary computer systems, the internet, mobile computing equipment such as portable devices, and/or other sources). The sensors that gather data during the operations of block 124 may provide information on vehicle 10 such as vehicle speed, direction of travel (e.g., forward/reverse status, angular direction of forward movement, or other vehicle travel data based on steering system data and/or location data from a global position system sensor in vehicle 10), expected location (e.g., a predicted location at a particular time based on a prediction from an autonomous vehicle system and/or other processing system that analyzes speed, direction of travel such as whether vehicle 10 is moving forward or is moving in reverse, traffic and road conditions, etc. to determine where vehicle 10 will be located in the future), weather (e.g., whether road conditions are wet or dry, temperature, whether precipitation that might influence sensor data gathering operations is present, etc.), the presence of absence of direct sunlight, whether the sun has set, whether artificial lighting is or is not present, ambient lighting intensity level information, information on the location and movements of nearby objects such as structures associated with a roadway, parking structure, other vehicles, pedestrians, etc., information on street signs, image data, radar data, lidar data, and/or other data.

During the operations of block 126, the information gathered during block 124 may be used by the control circuitry of vehicle 10 to determine how to reposition one or more sensors 26 and/or to otherwise adjust the operation of vehicle propulsion systems and/or other equipment in vehicle 10. Sensors may also be moved to track objects, to provide visual feedback to pedestrians and others, etc. The control circuitry of vehicle 10 may adjust the position and other attributes of sensor 26 to stow and/or deploy sensor 26, to adjust the direction of view of sensor 26, to adjust aerodynamics for vehicle 10 (e.g., to place sensor 26 in a position that helps reduce aerodynamic drag), to project sensor 26, to lock sensor into a desired position (e.g., using a sensor movement locking system), to cover or uncover sensor 26 by moving a window structure or other cover associated with sensor 26, etc. In some configurations, the position of sensor 26 is adjusted based on the driving mode of vehicle 10. For example, sensor 26 may be stowed in body 12 and optionally covered with a protective cover when vehicle 10 is parked. In response to forward moving, the control circuitry of vehicle 10 can deploy sensor 26 into a first position in which aerodynamic drag is relatively low, the direction of view of sensor 26 is oriented towards the sides of vehicle 10 to detect vehicles and/or pedestrians, and can lock the position of the sensor to ensure that sensor measurements are accurate. In response to detection of reverse motion of vehicle 10, the control circuitry can deploy sensor 26 to a position where the direction of view of sensor 26 is oriented more towards the rear of vehicle 10 than when vehicle 10 is moving forward. This allows sensor data to be gathered from the rear of vehicle 10 so that vehicle 10 may be autonomously driven or manually driven towards the rear while avoiding obstacles. If desired, the sensor can also be tilted downwards from its forward-driving position when vehicle 10 is stopped or driving in reverse to help gather information on objects in the roadway adjacent to vehicle 10 and/or to otherwise monitor the immediate surroundings of the vehicle. In addition to using sensor data from block 124 to determine how to position, cover, lock, and/or otherwise operate sensors 26, sensor data maybe used to drive (or otherwise move) vehicle 10 autonomously, may be used to help vehicle 10 navigate obstacles, may be used to locate pedestrians, vehicles, and other objects, etc. If desired, sensors and/or sensor covers may be moved to simulate eye movements, eye winks, or other activities that serve to inform pedestrians or others in the vicinity of vehicle 10 of the operating status of vehicle 10. As an example, sensor movements, cover movements, light output from a light-emitting device such as a headlight, parking light, or status indicator light, text or graphics displayed by a display, or other visual output may be provided to inform pedestrians and other in the vicinity of vehicle 10 of the current operating status of vehicle 10 (e.g., whether vehicle 10 is stationary, about to move, or moving, whether a pedestrian has been recognized by vehicle 10, etc.). Audio output based on sensor data may accompany this visual output and/or may be provided separately.

As indicated by line 128, the operations of blocks 124 and 126 may be performed continuously during use of vehicle 10.

The foregoing is merely illustrative and various modifications can be made to the described embodiments. The foregoing embodiments may be implemented individually or in any combination.

What is claimed is:

1. A system operable on a surface, comprising:
   a body;
   control circuitry configured to gather information on movement of the body relative to the surface, wherein the gathered information comprises a speed at which the body is moving; and
   a movable sensor mounted to the body, wherein the movable sensor is configured to move between a first position, a second position, and a third position in response to the gathered information on the movement of the body and wherein the movable sensor comprises a sensor selected from the group consisting of: a lidar sensor, a radar sensor, and a camera, and wherein the movable sensor is configured to move to the third position when the system is stationary, is configured to move to the first position when the system is moving at a first speed, and is configured to move to the second position when the system is moving at a second speed that is greater than the first speed.

2. The system defined in claim 1 wherein the movable sensor has a sensor housing with a sensor housing surface that is configured to lie flush with an external surface of the body when the movable sensor is in the first position, wherein the movable sensor has an angle-of-view, and wherein, in the second position, the movable sensor is configured to orient the angle-of-view to cover a rearward direction relative to the body.

3. The system defined in claim 2 wherein the movable sensor has a hinge and an actuator configured to rotate the sensor housing about the hinge.

4. The system defined in claim 1 wherein the gathered information on the movement of the body comprises information on whether the system is moving forward and wherein the movable sensor is configured to move to the second position in response to determining that the system is moving forward.

5. The system defined in claim 1 wherein the gathered information on the movement of the body comprises information on whether the system is parked and wherein the movable sensor is configured to move to the first position when the system is parked.

6. The system defined in claim 1 wherein the first position points the movable sensor horizontally to a side of the body and wherein the second position tilts the movable sensor downwards relative to the first position.

7. The system defined in claim 1 wherein the gathered information on the movement of the body comprises information on a speed at which the body is moving relative to the surface and wherein the movable sensor is configured to move between the first position and the second position based on the speed.

8. The system defined in claim 1 wherein the first position is a stowed position and wherein the second position is a deployed position in which the movable sensor protrudes from the body more than in the stowed position.

9. The vehicle system defined in claim 1 wherein the movable sensor has a sensor housing and a positioner configured to translate the sensor housing between the first and second positions.

10. The system defined in claim 9 wherein the positioner is configured to rotate the sensor housing about an axis.

11. The system defined in claim 1 wherein the control circuitry is configured to move the movable sensor to track an object.

12. The system defined in claim 1 wherein the control circuitry is configured to move the movable sensor to provide visual feedback to a pedestrian.

13. The system defined in claim 1 wherein the movable sensor comprises an inertial measurement unit configured to measure movement of the movable sensor.

14. A system configured to operate on a surface, comprising:
 a body having a body front that faces in a forward direction, having a body rear that faces in a rearward direction opposite to the forward direction, and having first and second sides;
 a movable sensor mounted to a given one of the sides, wherein the movable sensor is configured to move between a first position that is flush with the given side and a second position in which the movable sensor protrudes from the given side and wherein the movable sensor has an angle-of-view that does not cover the rearward direction when in the first position and that covers the rearward direction when in the second position; and
 control circuitry that is configured to detect a location of the body on the surface and that is configured to direct the movable sensor to move from the first position to the second position based on the location.

15. The system defined in claim 14 wherein the body has a portion forming an alignment structure that constrains motion of the movable sensor to align the movable sensor relative to the body in the second position.

16. The system defined in claim 14 further comprising a cleaner configured to clean the movable sensor.

17. The system defined in claim 14 further comprising a hinge, wherein the movable sensor is configured to rotate about the hinge.

18. The system defined in claim 14 wherein the movable sensor comprises a sensor selected from the group consisting of: a lidar sensor, a radar sensor, and an image sensor.

19. A system, comprising:
 a body operable on a surface;
 a movable sensor, wherein the movable sensor is selected from the group consisting of: a lidar sensor, a radar sensor, and a camera;
 a deployment mechanism configured to move the movable sensor between a stowed position and a deployed position in response to changes in movement of the body relative to the surface; and
 an accelerometer configured to measure movement of the body, wherein the movable sensor is configured to move based on the measured movement of the body to isolate the movable sensor from vibrations.

20. The system defined in claim 19 further comprising a sensor position locking mechanism configured to prevent movement of the movable sensor.

21. The system defined in claim 19 further comprising a movable cover configured to cover the movable sensor in the stowed position.

22. The system defined in claim 19 wherein the deployment mechanism comprises a robotic segmented arm.

23. The system defined in claim 19 wherein the deployment mechanism comprises a deployment mechanism selected from the group consisting of: a rack-and-pinion deployment mechanism, a rotational actuator deployment mechanism, a four-bar linkage, and a linear actuator deployment mechanism.

24. The system defined in claim 19 wherein the deployment mechanism is configured to move the movable sensor in response to parking of the body.

\* \* \* \* \*